United States Patent
Schlosser et al.

(10) Patent No.: US 6,808,189 B1
(45) Date of Patent: Oct. 26, 2004

(54) STEER AXLE ASSEMBLY WITH INVERTED STEERING KNUCKLE

(75) Inventors: Kraig Schlosser, Columbia City, IN (US); Kent Davison, Columbia City, IN (US)

(73) Assignee: Dana Corporation, Toledo, OH (US)

( * ) Notice: Subject to any disclaimer, the term of this patent is extended or adjusted under 35 U.S.C. 154(b) by 125 days.

(21) Appl. No.: 09/855,336

(22) Filed: May 15, 2001

(51) Int. Cl.[7] .............................................. B62D 7/18
(52) U.S. Cl. ............................................... 280/93.512
(58) Field of Search ................... 280/93.512; 180/905; 301/111.01, 111.03, 137, 124.1, 131, 132, 127

(56) References Cited

U.S. PATENT DOCUMENTS

| | | | |
|---|---|---|---|
| 811,076 A | | 1/1906 | Miller |
| 840,782 A | * | 1/1907 | Lindsay .................. 280/93.512 |
| 1,104,534 A | * | 7/1914 | Mitchell et al. ...... 280/124.116 |
| 1,355,502 A | * | 10/1920 | Riise .................... 280/124.171 |
| 1,762,407 A | | 6/1930 | Mogford et al. .............. 409/94 |
| 1,873,453 A | | 8/1932 | Mogford et al. |
| 2,040,577 A | | 5/1936 | Urschel ....................... 301/124 |
| 2,193,752 A | * | 3/1940 | Yungling .................... 280/103 |
| 2,299,926 A | * | 10/1942 | Phelps ........................ 280/788 |
| 2,566,565 A | * | 9/1951 | Hill ............................ 280/103 |
| 2,911,262 A | | 11/1959 | Franck ....................... 301/124 |
| 3,423,104 A | * | 1/1969 | Cecil et al. ............ 280/93.512 |
| 4,203,617 A | * | 5/1980 | Bowman, Jr. ............... 280/797 |
| D255,230 S | | 6/1980 | Marti ......................... D12/160 |
| 5,269,546 A | * | 12/1993 | Pollock et al. ............. 280/81.6 |
| 5,588,660 A | * | 12/1996 | Paddison ..................... 180/400 |
| 5,865,452 A | | 2/1999 | Chalin ................. 280/124.125 |
| 6,131,691 A | * | 10/2000 | Morch ........................ 180/412 |
| 6,267,198 B1 | * | 7/2001 | Hurlburt et al. ............. 180/414 |
| 6,302,233 B1 | * | 10/2001 | Okamuro et al. ........... 180/253 |

\* cited by examiner

*Primary Examiner*—Lesley D. Morris
*Assistant Examiner*—Paul Royal, Jr.
(74) *Attorney, Agent, or Firm*—Dykema Gossett PLLC

(57) ABSTRACT

A steer axle assembly is provided having an axle beam disposed about a longitudinal axis and an inverted knuckle yoke. The yoke includes a body portion that is affixed to an external surface of the axle beam by welding. The yoke further includes first and second arms extending from the body portion. Body the body portion and arms are disposed one side of the axis extending through the axle beam. The drop of the axle is varied by varying the length of the body portion of the knuckle yoke.

22 Claims, 1 Drawing Sheet

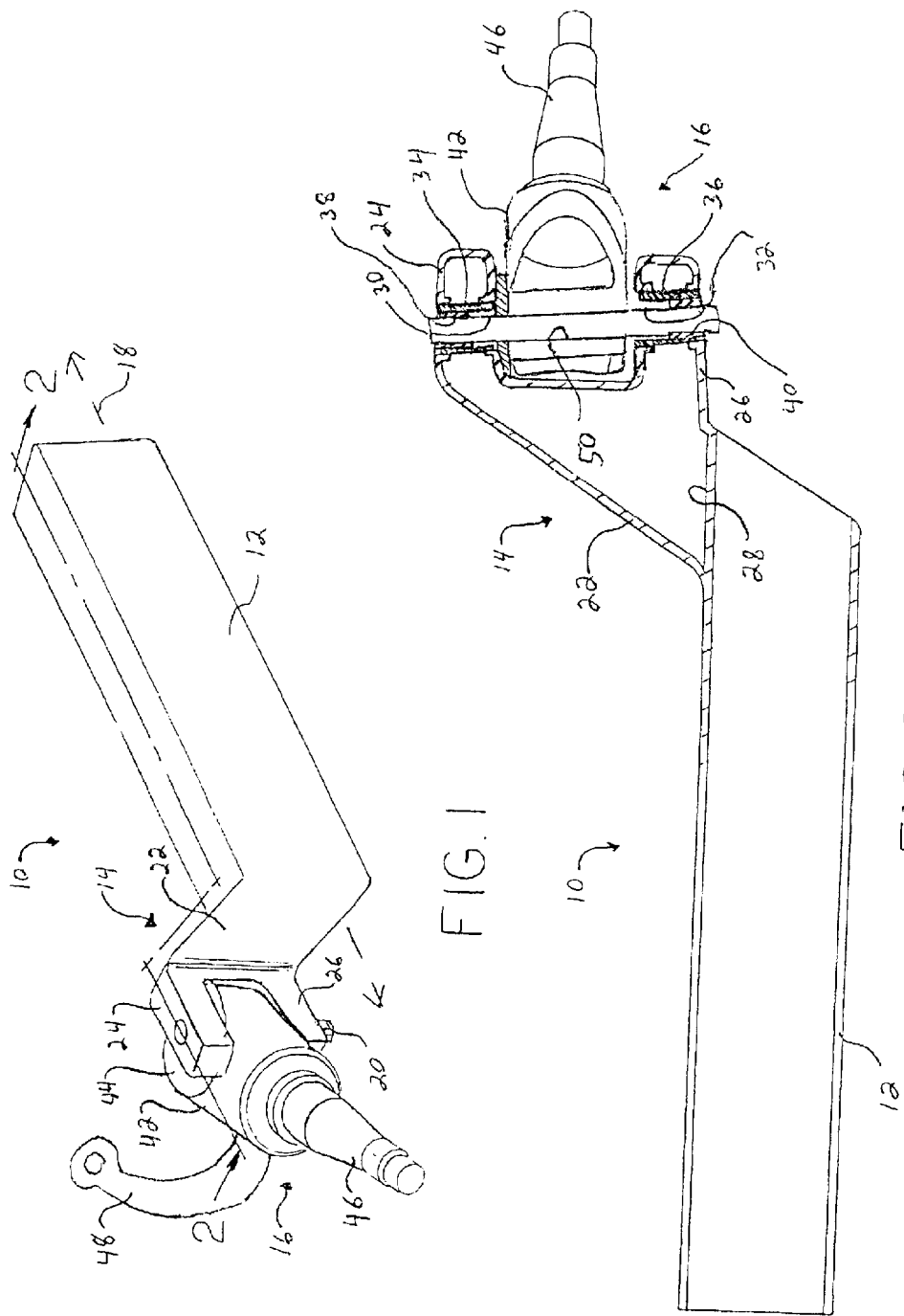

STEER AXLE ASSEMBLY WITH INVERTED STEERING KNUCKLE

BACKGROUND OF THE INVENTION

1. Field of the Invention

This invention relates to a steer axle assembly and more particularly to a steer axle assembly having an inverted steering knuckle.

2. Disclosure of Related Art

In a conventional steer axle assembly, an I-shaped or tubular beam extends along a longitudinal axis. Each end of the beam defines a boss having a through bore configured to receive a kingpin. A steering knuckle is then rotatably mounted on the kingpin. Variations in the drop of the axle (i.e., the variation in position of the steering knuckle and vehicle wheels relative to the longitudinal axis of the axle beam) are accomplished either by curving each end of the beam or by affixing a plurality of plates or other structural components to each end of the beam so that the position of the kingpin boss may be varied relative to the longitudinal axis of the beam.

Conventional steer axle assemblies suffer from several disadvantages. First, conventional steer axle assemblies require a relatively large amount of material and are relatively heavy. As a result, conventional steer axle assemblies have relatively high material and assembly costs and the increased weight of the assemblies causes reductions in fuel efficiencies among other problems. Second, conventional steer axle assemblies are inflexible with respect to design changes. In particular, it is difficult and costly to vary the drop of the axle and to attach other steer axle and suspension components of varying sizes and configurations.

There is thus a need for a steer axle assembly that will minimize or eliminate one or more of the above-mentioned deficiencies.

SUMMARY OF THE INVENTION

This invention relates to a steer axle assembly.

A steer axle assembly in accordance with the present invention includes an axle beam disposed about a longitudinal axis. The assembly also includes an inverted knuckle yoke (or steering knuckle). The knuckle yoke may be fabricated and includes a body portion and first and second arms extending from the body portion.

The first and second arms are configured to receive a kingpin. The body portion of the knuckle yoke is coupled to an external surface of the axle beam. The body portion may be positioned such that both of the first and second arms are disposed on one side of the longitudinal axis.

A steer axle assembly in accordance with the present invention has several advantages as compared to conventional steer axle assemblies. In particular, the inventive assembly requires less material to manufacture and is lighter than conventional steer axle assemblies because of the use of an inverted knuckle yoke. The inventive assembly also allows flexibility in the drop of the axle by simply varying the length of the body portion of the knuckle yoke. Finally, the inventive assembly is able to accommodate a wide variety of steer axle, suspension, and brake components. For example, the inventive assembly can accommodate a wide variety of wheel spindles allowing the axle to be used with a wide variety of wheels.

These and other features and objects of this invention will become apparent to one skilled in the art from the following detailed description and the accompanying drawings illustrating features of this invention by way of example.

BRIEF DESCRIPTION OF THE DRAWINGS

FIG. 1 is a perspective view of a steer axle assembly in accordance with the present invention.

FIG. 2 is a cross-sectional view of the steer axle assembly of FIG. 1.

DETAILED DESCRIPTION OF THE PREFERRED EMBODIMENTS

Referring now to the drawings wherein like reference numerals are used to identify identical components in the various views, FIGS. 1-2 illustrate a steer axle assembly 10 in accordance with the present invention. Assembly 10 is provided for use in a vehicle to support the components of a pair of wheel assemblies disposed on opposite sides of the vehicle including, for example, wheel hubs (not shown) and wheels (not shown). Assembly 10 is adapted for use in large trucks. It should be understood, however, that assembly 10 may be find use in a wide variety of vehicles. Assembly 10 includes an axle beam 12 and an inverted knuckle yoke 14. Assembly 10 may also include a spindle assembly 16. In the illustrated embodiment, only one end of the axle assembly 10 is illustrated. It should be understood, however, that the other end of assembly 10 may be similarly constructed. In particular, the other end of beam 12 may include a similar yoke 14 and spindle assembly 16.

Beam 12 is provided to support a vehicle frame (not shown) on wheels (not shown) disposed proximate either end of beam 12. Beam 12 may be made from conventional metals and metal alloys such as steel and may be forged or fabricated. Beam 12 extends along a longitudinal axis 18. Beam 12 may be tubular, as shown, and may be shaped so as to be generally rectangular in cross-sections taken in planes perpendicular to axis 18. It should be understood by those of skill in the art, however, that the cross-sectional shape of beam 12 may be varied and that beam 12 may further have cross-sections of varying shape in planes perpendicular to axis 18 without departing from the spirit of the present invention.

Knuckle yoke 14 is provided to receive a kingpin 20 on which spindle assembly 16 may be rotatably mounted so as to allow steering of the vehicle wheels (not shown). Yoke 14 may be made from steel or other conventional metals or metal alloys and may be forged or fabricated. Yoke 14 may be coupled to beam 12. Alternatively, yoke 14 may be made integral with beam 12 and yoke 14 and beam 12 may comprise a single forging or fabrication. Yoke 14 has a body portion 22 and first and second arms 24, 26.

Body portion 22 is coupled to a portion of an external surface 28 of beam 12 and may be welded thereto. Alternatively, as described above, body portion 22 may be made integral with beam 12. Portion 22 extends from beam 12 in an outboard direction and at an angle relative to axis 18. Body portion 22 is generally triangular in shape when assembly 10 is viewed from the front or rear (in the longitudinal direction of a vehicle) and is generally rectangular in shape when assembly 10 is viewed from the side (in the transverse direction of a vehicle) in the illustrated embodiment. It should be understood, however, that the size, shape, and configuration of body portion 22 may be varied without departing from the spirit of the present invention. Body portion is disposed on one side of axis 18. In accordance with the present invention, the drop of axle assembly 10 may be easily varied by lengthening body portion 22 to thereby vary the location of arms 24, 26 relative to beam 12 and axis 18.

Arms 24, 26 are provided to receive and retain kingpin 20. Arms 24, 26 extend from body portion 22 in an outboard direction and are disposed on one side of axis 18 at a slight angle relative to axis 18. It should be understood by those of skill in the art that this angle may vary without departing from the spirit of the present invention. In the illustrated embodiment, arms 24, 26 are generally rectangular in shape when assembly 10 is viewed from the front or rear (in the longitudinal direction of a vehicle) and are generally square in shape when assembly 10 is viewed from the side (in the transverse direction of a vehicle). It should be understood, however, that the size, shape, and configuration of arms may be varied without departing from the spirit of the present invention. Arms 24, 26 may be spaced a predetermined distance to receive spindle assembly 16. Arms 24, 26 define coaxial bores 30, 32 configured to receive tubes 34, 36 in which kingpin 20 is disposed. Tubes 34, 36 may be made from conventional metals and metal alloys such as steel and may be welded to arms 24, 26 within bores 30, 32. Tubes 34, 36 may include bushings 38, 40 disposed within tubes 34, 36. Bushings 38, 40 are configured to receive kingpin 20 and to allow rotation of kingpin 20 relative to tubes 34, 36 and arms 24, 26.

Spindle assembly 16 is provided to mount a wheel hub (not shown) and wheels (not shown) of a vehicle. Assembly 16 may include a mounting body 42, a thrust washer 44, a spindle 46 and a steering arm 48.

Body 42 is received between arms 24, 26 of yoke 14. Body 42 may be made from conventional metals and metal alloys such as steel and may be forged or fabricated. Body 42 defines a bore 50 configured to receive kingpin 20. Bore 50 is coaxial with bores 30, 32 in arms 24, 26 of yoke 14. Body 42 may be coupled to kingpin 20 using draw keys or in other conventional ways to allow rotation of body 42 with kingpin 20.

Thrust washer 44 is provided to limit axial movement of body 42 and kingpin 20. Washer 44 is conventional in the art. In the illustrated embodiment, washer 44 is disposed between body 42 and arm 24. It should be understood, however, that washer 44 may alternatively be disposed between body 42 and arm 26 or that washers 44 may be disposed between body 42 and both arms 24, 26.

Spindle 46 is provided to support a wheel hub (not shown) and one or more wheels (not shown). Spindle 46 is conventional in the art and may be made from conventional metal and metal alloys such as steel. Spindle 46 may be forged or fabricated, but is preferably fabricated. Spindle 46 may be coupled to body 42 by welding or other conventional means of attachment. Spindle 46 includes a tapered portion configured to support inboard and outboard bearing sets in a conventional manner. In accordance with the present invention, a wide variety of spindles may be used in assembly 10, thereby supporting a wide variety of wheel packages, because spindle 46 is not limited by design considerations associated with the steering knuckle (to which spindle 46 is normally mounted).

Steering arm 48 is provided to coupled spindle assembly 16 to a conventional steering linkage (not shown) to thereby allow the wheels (not shown) to be steered. Arm 48 extends from body 42 of spindle assembly 16. Arm 48 may be integral with body 42 or may be coupled to body 42 in a conventional manner.

A steer axle assembly 10 in accordance with the present invention represents an improvement as compared to conventional steer axle assemblies. In particular, the use of an inverted knuckle yoke 14 allows much, if not all, of assembly 10 to be fabricated. Accordingly, assembly 10 weighs less and requires less material than conventional steer axle assemblies. As a result, the inventive steer axle assembly 10 is less costly to manufacture and install on vehicles. The inventive assembly 10 is also very flexible with respect to design changes. The drop of the axle may be easily varied simply by varying the length of body portion 22 of yoke 14. Further, yoke 14 can accommodate a wide variety of steer axle, suspension, and brake components.

While the invention has been particularly shown and described with reference to the preferred embodiments thereof, it is well understood by those skilled in the art that various changes and modifications can be made in the invention without departing from the spirit and scope of the invention.

We claim:

1. A steer axle assembly, comprising:
   an axle beam disposed about a longitudinal axis; and,
   an inverted knuckle yoke having a body portion and first and second arms extending from said body portion, said first and second arms configured to received a kingpin;
   wherein said body portion is coupled to an external surface of said axle beam at a location inboard of a longitudinal end of said axle beam and said body portion is disposed on only one side of said longitudinal axis of said axle beam.

2. The assembly of claim 1 wherein said first and second arms are disposed on the same side of said longitudinal axis of said axle beam.

3. The assembly of claim 1 wherein said body portion is welded to said external surface of said axle beam.

4. The assembly of claim 1 wherein said body portion extends from said axle beam in an outboard direction and at an angle to said longitudinal axis of said axle beam.

5. The assembly of claim 1 wherein said axle beam and said inverted knuckle yoke are formed as a single integrated forging or fabrication.

6. The assembly of claim 1 wherein all of said body portion is disposed on said one side of said longitudinal axis of said axle beam.

7. The assembly of claim 1 wherein said body portion is rigidly coupled to said external surface of said axle beam.

8. A steer axle assembly, comprising:
   an axle beam disposed about a longitudinal axis;
   an inverted knuckle yoke having a body portion and first and second arms extending from said body portion, said first and second arms configured to received a kingpin, said body portion coupled to an external surface of said axle beam; and,
   a spindle assembly rotatably mounted on said kingpin
   wherein said spindle assembly includes:
      a mounting body having a bore configured to receive said kingpin; and,
      a spindle coupled to said mounting body.

9. The assembly of claim 8 wherein said body portion is welded to an external surface of said axle beam.

10. The assembly of claim 8 wherein said body portion is disposed on only one side of said longitudinal axis of said axle beam.

11. The assembly of claim 8 wherein said body portion extends from said axle beam in an outboard direction and at an angle to said longitudinal axis of said axle beam.

12. The steer axle assembly of claim 8 wherein said spindle assembly further includes a washer disposed between said mounting body and one of said first and second arms.

13. The steer axle assembly of claim 8 wherein said spindle assembly further includes a steering arm coupled to said mounting body.

14. The steer axle assembly of claim 8 wherein said first and second arms are disposed on the same side of said longitudinal axis of said axle beam.

15. The assembly of claim 8 wherein said axle beam and said inverted knuckle yoke are formed as a single integrated forging or fabrication.

16. A steer axle assembly, comprising:

an axle beam disposed about a longitudinal axis; and, an inverted knuckle yoke having a body portion and first and second arms extending from said body portion, said first and second arms configured to received a kingpin, said kingpin having a longitudinal axis intersecting said longitudinal axis of said axle beam;

wherein said body portion is coupled to an external surface of said axle beam and said body portion is disposed on only one side of said longitudinal axis of said axle beam.

17. The assembly of claim 16 wherein said first and second arms are disposed on the same side of said longitudinal axis of said axle beam.

18. The assembly of claim 16 wherein said body portion is welded to said external surface of said axle beam.

19. The assembly of claim 16 wherein said body portion extends from said axle beam in an outboard direction and at an angle to said longitudinal axis of said axle beam.

20. The assembly of claim 16 wherein said axle beam and said inverted knuckle yoke are formed as a single integrated forging or fabrication.

21. The assembly of claim 16 wherein all of said body portion is disposed on said one side of said longitudinal axis of said axle beam.

22. The assembly of claim 16 wherein said body portion is rigidly coupled to said external surface of said axle beam.

* * * * *